US008807449B1

(12) United States Patent
Obi (10) Patent No.: US 8,807,449 B1
(45) Date of Patent: Aug. 19, 2014

(54) COMBINED TUB WATER OVERFLOW VALVE AND PESTICIDE DELIVERY SYSTEM

(76) Inventor: John Obi, St. Augustine, FL (US)

(*) Notice: Subject to any disclaimer, the term of this patent is extended or adjusted under 35 U.S.C. 154(b) by 330 days.

(21) Appl. No.: 13/328,818

(22) Filed: Dec. 16, 2011

(51) Int. Cl.
| *A01M 7/00* | (2006.01) |
| *A01M 1/24* | (2006.01) |
| *A01M 1/20* | (2006.01) |
| *B05B 1/14* | (2006.01) |
| *B05B 17/04* | (2006.01) |
| *B05B 17/00* | (2006.01) |
| *B05B 15/00* | (2006.01) |

(52) U.S. Cl.
USPC ........... 239/1; 239/547; 239/548; 239/565; 239/566; 43/124; 43/132.1; 43/900; 4/546; 4/651

(58) Field of Classification Search
USPC ........... 239/1, 200, 208, 289, 302, 450, 536, 239/547, 548, 565, 566; 43/124, 131, 43/132.1, 900; 4/546, 584, 597, 638, 650, 4/651, 679, 680, 696
See application file for complete search history.

(56) References Cited

U.S. PATENT DOCUMENTS

| 3,782,026 | A | * | 1/1974 | Bridges et al. ................ 43/124 |
| 4,403,355 | A | * | 9/1983 | Petty ............................... 4/679 |
| 4,944,110 | A | * | 7/1990 | Sims .............................. 43/124 |
| 5,184,418 | A | * | 2/1993 | Fletscher ....................... 43/124 |
| 5,361,533 | A | * | 11/1994 | Pepper .......................... 43/124 |
| 6,493,987 | B1 | * | 12/2002 | Aesch et al. .................. 43/124 |
| 6,708,444 | B2 | * | 3/2004 | Aesch, Jr. ..................... 43/124 |

* cited by examiner

*Primary Examiner* — Darren W Gorman
(74) *Attorney, Agent, or Firm* — Gold & Rizvi, P.A.; Glenn E. Gold (57) ABSTRACT

A pesticide delivery system integrated into an overflow drain system of a bathtub, a sink, or any other water-retaining basin. The pesticide delivery system includes a pesticide intake segment passing through a transition passage, wherein the transition passage is formed through a wall of a section of the overflow drain system. A fluid retentive seal is located between an exterior of the pesticide intake segment and the overflow conduit wall. A pesticide distribution conduit extends from a distribution end of the pesticide intake segment to a termination end. Pesticide can be discharged through a pesticide delivery port located at an end of the pesticide distribution conduit or through a plurality of pesticide distribution ports spatially located along the pesticide distribution conduit. A plurality of pesticide distribution continuation conduits can be in fluid communication with the pesticide distribution conduit to distribute the pesticide along various directions and locations.

20 Claims, 7 Drawing Sheets

COMBINED TUB WATER OVERFLOW VALVE AND PESTICIDE DELIVERY SYSTEM

FIELD OF THE INVENTION

The present disclosure generally relates to an apparatus for delivering pesticides behind a bathtub. More particularly, the present disclosure relates to a pesticide delivery conduit that is routed providing access to the conduit within overflow plumbing, passing the pesticide conduit through a wall of the overflow plumbing and enabling delivery of the pesticide within a wall behind a tub, sink, or similar object.

BACKGROUND OF THE INVENTION

Termites, ants, roaches, and other insects commonly congregate or nest within walls of structures. Spot treatment is completed by accessing an interior portion of a wall by drilling through the wall, cutting and temporarily removing a section of the wallboard, and the like. Although these would dictate a repair and painting process, the process is not catastrophic. In locations where plumbing fixtures are positioned, the process becomes significantly more complex. The exterminator would need to remove the plumbing fixtures from their installed location, treat the affected area, then reinstall the previously removed plumbing fixtures. One can appreciate the many potential issues with this process.

Plumbing fixtures that include a water retaining basin generally include an overflow drain to ensure against accidentally overflowing the basin and flooding the adjacent area. The overflow drain is commonly located just below an upper brim of the fixture. As water rises within the basin portion of the fixture, the water reaches the overflow drain. When the water reaches the level of the overflow drain, the water enters an orifice provided by the overflow drain and is transported to the sewage drain by piping.

Therefore, it would be desirable to have a non-destructive, discrete delivery system to disperse pesticides behind plumbing fixtures such as bathtubs, sinks, water basins, and the like.

SUMMARY OF THE INVENTION

The present disclosure is generally directed to discrete pesticide delivery system, the pesticide delivery system comprising:
  a plumbing fixture overflow drain system comprising:
  an overflow port attachment flange in fluid communication with at least one overflow conduit terminating at a collective sewage joint; and
  a pesticide delivery system comprising:
  a pesticide intake segment comprising a pesticide intake segment port located at an inlet end thereof and a pesticide intake continuation coupling section located at an opposite end thereof, the pesticide intake segment passing through a transition passage formed through a wall of a section of the at least one overflow conduit, the transition passage comprising a fluid retentive seal between an exterior of the pesticide intake segment and the overflow conduit wall, and
  a pesticide distribution conduit comprising a pesticide intake continuation coupling section located at a connection end thereof and at least one pesticide delivery port located along the pesticide distribution conduit and at a distance from the pesticide intake continuation coupling section, the pesticide intake continuation coupling section in fluid communication with the pesticide intake continuation coupling section.

In a second aspect, the pesticide distribution conduit includes a single pesticide delivery port located at a distal end thereof.

In yet another aspect, the pesticide distribution conduit is fabricated of flexible tubing.

In yet another aspect, the pesticide delivery system further comprises a delivery conduit plug removably inserted into the pesticide intake segment port to seal the pesticide delivery system.

In yet another aspect, the pesticide distribution conduit is assembled to the pesticide intake segment using an overlap friction interference joint.

In yet another aspect, the pesticide distribution conduit is assembled to the pesticide intake segment using a barbed interface.

In yet another aspect, the pesticide distribution conduit is fabricated of flexible tubing, which is attached to the overflow plumbing using at least one pesticide conduit retaining member. Several exemplary pesticide conduit retaining members include a cable tie, a pipe clamp, and the like.

In yet another aspect, the pesticide delivery system further comprises a delivery conduit plug, wherein the delivery conduit plug is removably inserted into the pesticide intake segment port.

In yet another aspect, the pesticide distribution conduit is fabricated of flexible tubing that is attached to the overflow plumbing using at least one pesticide conduit retaining member. Several exemplary pesticide conduit retaining members include a cable tie, a pipe clamp, and the like.

In yet another aspect, the pesticide distribution conduit can further comprise multiple pesticide distribution continuation conduits. The multiple pesticide distribution continuation conduits can be attached to the pesticide distribution conduit using a manifold coupler.

In yet another aspect, the pesticide distribution conduit can further comprise a plurality of spatially arranged pesticide distribution ports.

In yet another aspect, the plumbing fixture overflow drain system further comprises a hardware attachment bracket located proximate the overflow port attachment flange.

In yet another aspect, the plumbing fixture overflow drain system further comprises an overflow drain cover, wherein the overflow drain cover is removably affixed to the hardware attachment bracket by a fastener.

In yet another aspect, the hardware attachment bracket further comprises a pesticide conduit bracket.

In yet another aspect, the overflow drain system comprises an elbow, wherein the transition passage can be provided through a sidewall thereof.

In yet another aspect, the overflow drain system comprises a vertical conduit section, wherein the transition passage can be provided through a sidewall thereof.

In yet another aspect, the overflow drain pesticide delivery system further comprises a basin drain system; the basin drain system includes a basin drain conduit assembly comprising a basin drain flange for coupling to the basin drain of a bathtub.

In yet another aspect, the overflow drain pesticide delivery system further comprises a basin drain system; the basin drain system includes a basin drain conduit assembly comprising a basin drain flange for coupling to the basin drain of a bathtub.

In yet another aspect, the basin drain conduit assembly further comprises a horizontal conduit segment.

In yet another aspect, the basin drain conduit assembly further comprises a basin drain conduit elbow.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
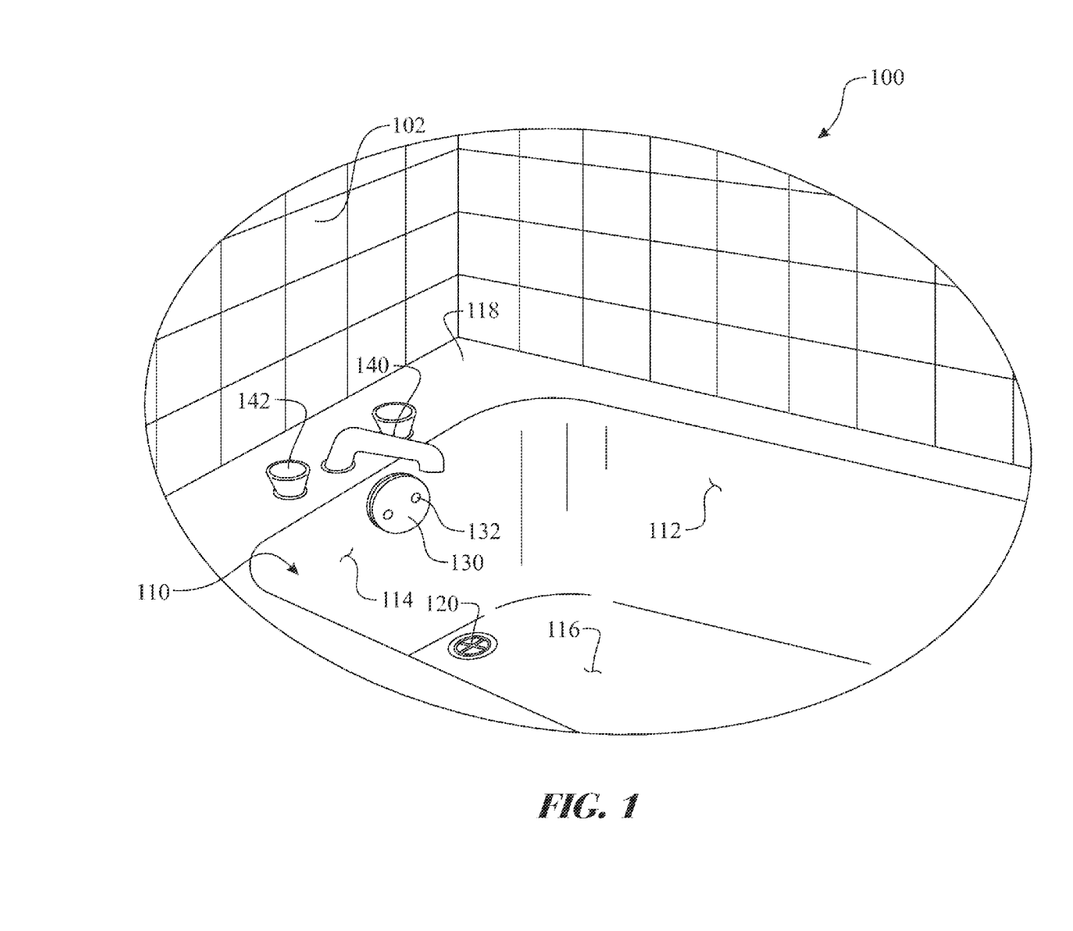
FIG. 1 presents an isometric view of an exemplary section of a bathtub introducing a common drain and an overflow drain.
Figure 2:
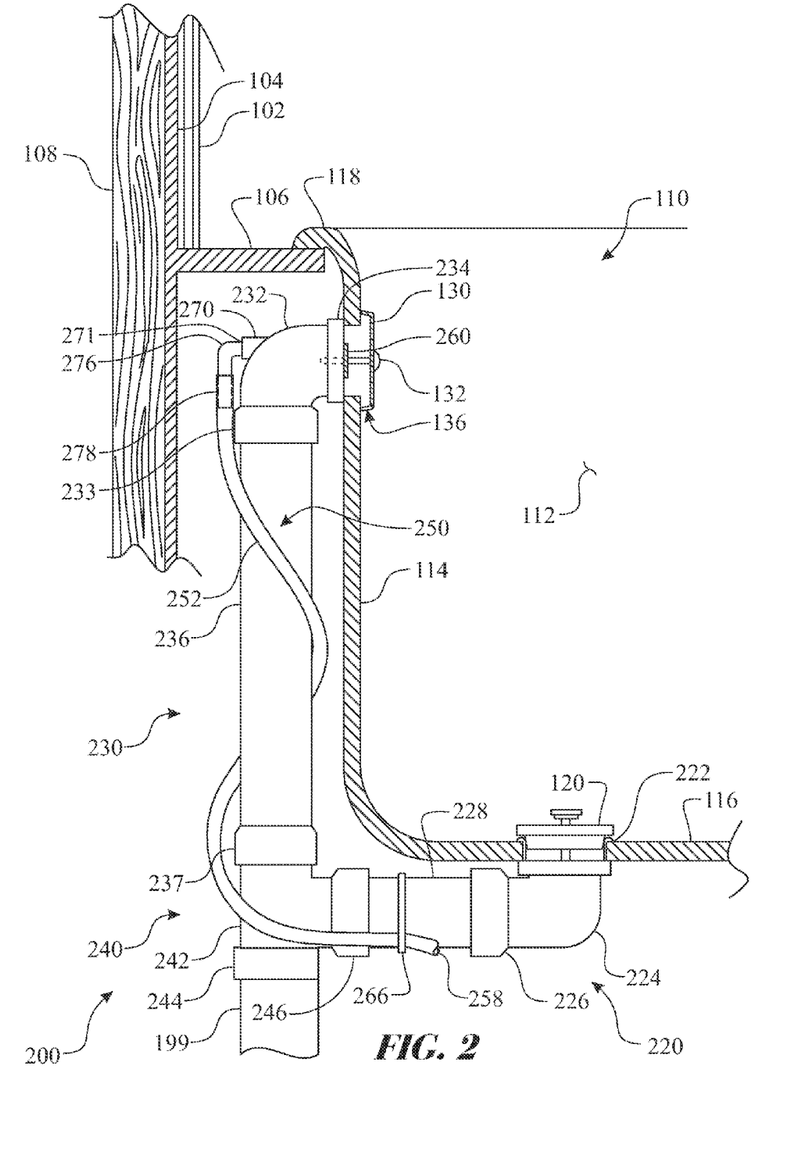
FIG. 2 presents a partially sectioned side view of the exemplary overflow drain pesticide delivery system, sectioning the tub and respective supporting structure and a side view of an exemplary basin and overflow drain combination.
Figure 3:
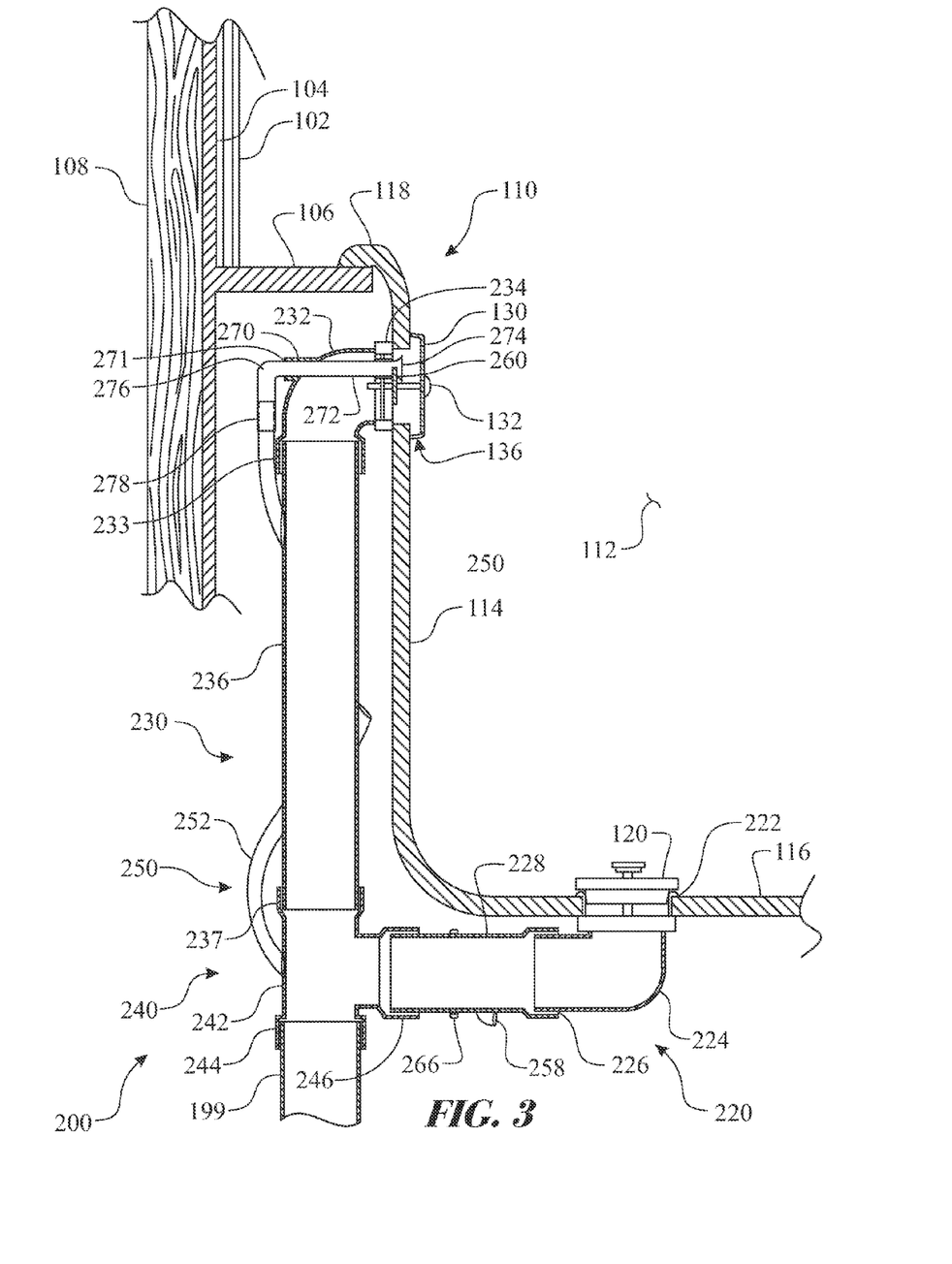
FIG. 3 presents a sectioned side view of the exemplary overflow drain pesticide delivery system, tub and respective supporting structure.
Figure 4:
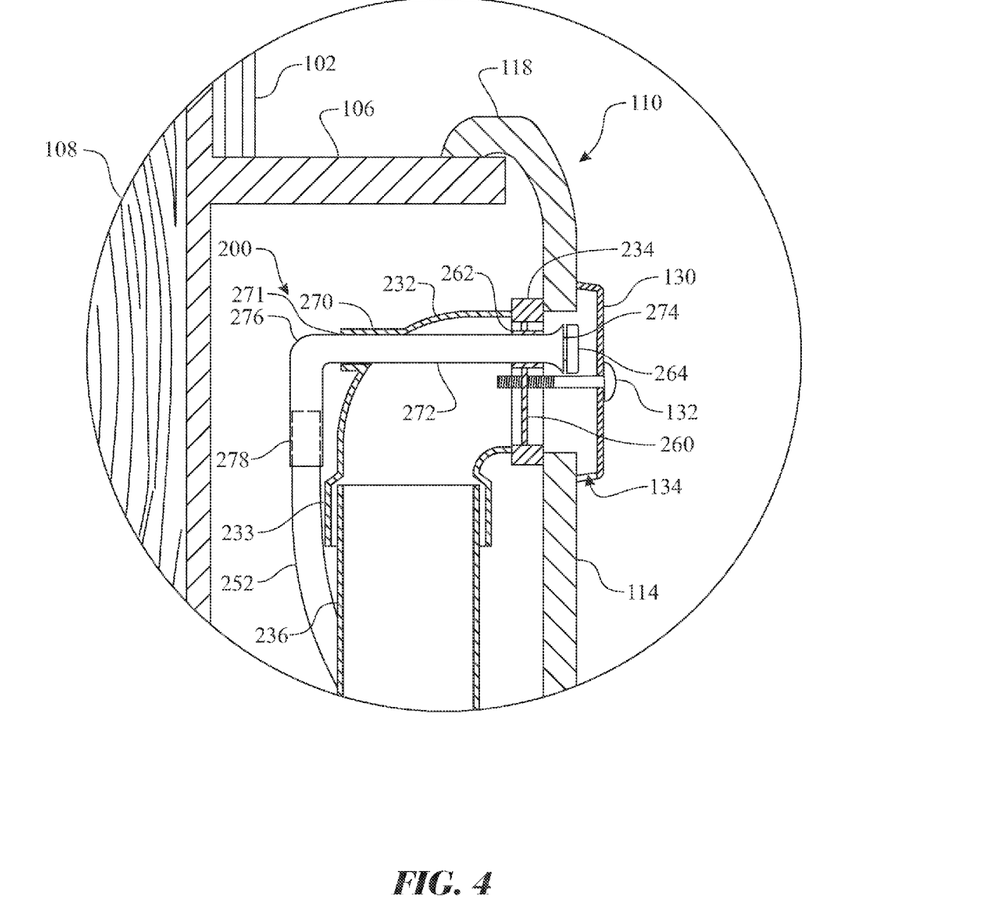
FIG. 4 presents a detailed and enlarged sectioned side view of an overflow portion of the exemplary overflow drain pesticide delivery system, tub and respective supporting structure.
Figure 5:
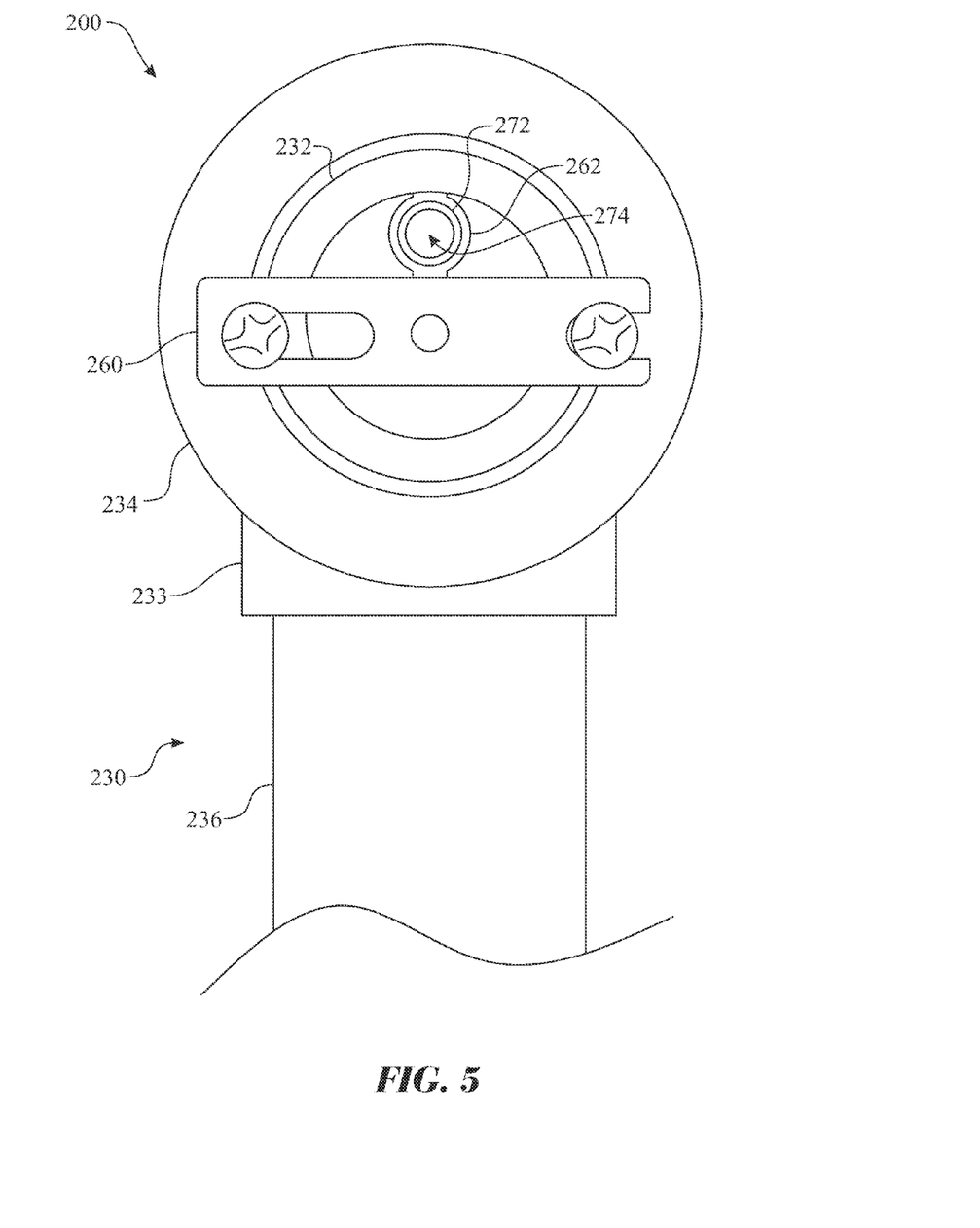
FIG. 5 presents a detailed and enlarged front view of the overflow portion of the exemplary overflow drain pesticide delivery system.
Figure 6:
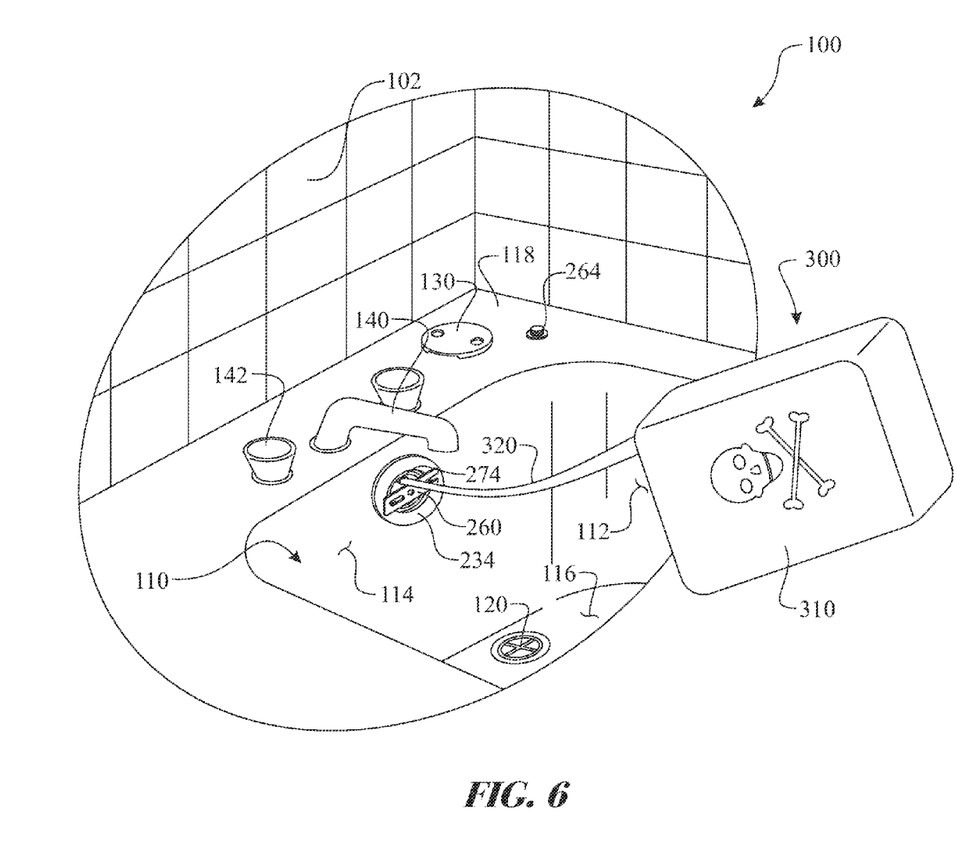
FIG. 6 presents an isometric view of the exemplary section of the bathtub introduced in FIG. 1, illustrating an exemplary overflow drain pesticide delivery system in operation.

An overflow drain pesticide delivery system 200 provides a pesticide delivery system integrated into an overflow drain system 230, wherein an exemplary overflow drain pesticide delivery system 200 is illustrated in FIGS. 2 through 6. The exemplary pesticide delivery system 250 remains concealed as illustrated in FIG. 1, until an exterminator utilizes the pesticide delivery system 250 to apply a pesticide to a location behind a bathroom 100 as illustrated in FIG. 6. The term pesticide is representative of any pest exterminating composition, including pesticides, insecticides or termiticides, and the like.

The overflow drain pesticide delivery system 200 provides an apparatus enabling an exterminator the ability to apply a pesticide to an area located behind a plumbing fixture, such as a bathtub 110. The bathtub 110 is commonly located within a bathroom 100. The exemplary bathtub 110 is located against one or more walls. The walls are fabricated including a series of spatially arranged wall studs 108. Green board 104 covers the series of spatially arranged wall studs 108. A waterproof material such as wall tiles 102 covers the green board 104. The exemplary bathtub 110 includes a pair of elongated sidewalls 112 and a pair of end wall 114 formed in a continuous manner creating a sidewall and a tub bottom 116 being contiguous about a base edge of the sidewall, collectively forming a basin for receiving and retaining water. A tub peripheral lip 118 is provided about an upper edge of the sidewall. A tub support brim 106 extends outward from the wall providing a support about the tub peripheral lip 118. Water is dispensed into the basin through a water spout 140. A water flow control valve 142 controls water flow through the water spout 140. The basin includes a basin drain 120 located through the tub bottom 116 and an overflow drain located through and within an upper portion of the sidewall.

The overflow drain pesticide delivery system 200 integrates a pesticide delivery system 250 into an overflow drain system 230, as illustrated in FIGS. 2 through 5. The overflow drain system 230 includes at least one conduit comprising an overflow drain flange 234 located at an inlet end of the at least one conduit and an overflow conduit joint 237 located at an opposite end of the at least one conduit. The exemplary at least one conduit includes an overflow entry elbow 232 coupled to an overflow conduit vertical segment 236 by an elbow joint 233. It is understood that a plurality of conduits in both shape, size, length, and the like can be utilized to form any necessary geometric passageway to connect the overflow port to the collective sewage drain. An overflow drain cover 130 is provided to partially cover an inlet orifice of the overflow drain system 230. The exemplary overflow drain cover 130 is secured in location by one or more overflow cover fasteners 132 that engage with an overflow drain flange 234 of a hardware attachment bracket 260. The overflow drain cover 130 includes an opening that provides an overflow pathway 136 for removal of water from the basin when the water exceeds a predetermined volume. The excess water flows past the opening in the overflow drain cover 130 and through the overflow drain system 230 to the collective sewage system 199.

A basin drain system 220 can be integrated into the overflow drain pesticide delivery system 200 as presented in the illustrated embodiment, or as a separate subsystem. The basin drain system 220 includes at least one conduit comprising a basin drain flange 222 located at an inlet end of the at least one conduit and a basin drain collection joint 246 located at an opposite end of the at least one conduit. The exemplary at least one conduit includes a basin drain conduit elbow 224 coupled to a basin drain conduit horizontal segment 228 by a basin drain conduit elbow joint 226. It is understood that a plurality of conduits in both shape, size, length, and the like can be utilized to form any necessary geometric passageway to connect the overflow port to the collective sewage drain.

A drain conduit collection assembly 240 can be utilized to collect and direct flow from each of the basin drain system 220 and overflow drain system 230 into a collective sewage system 199. The exemplary drain conduit collection assembly 240 is tee coupler having three coupling sections formed in fluid communication with each other. The exemplary drain conduit collection assembly 240 joins the overflow conduit joint 237, the basin drain collection joint 246 and a collective sewage joint 244 via a drain conduit tee coupler 242. The joints can be slip joints, threaded joints, and the like.

The various conduits and coupling sections described above can be fabricated of any standard plumbing materials, including metals such as steel, iron, copper, brass, and the like or plastics, such as polyvinyl chloride (PVC), chlorinated polyvinyl chloride (CPVC), fibre reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS), and the like.

A pesticide intake segment 272 is integrated into the overflow drain system 230, wherein a portion of the pesticide intake segment 272 passes through a transition passage 270 formed through a section of a wall of the overflow drain system 230. The transition passage 270 forms a fluid retentive seal 271 between an exterior of the pesticide intake segment and the overflow conduit wall. The transition passage 270 can pass through any portion of the overflow drain system 230, including the overflow entry elbow 232, the overflow conduit vertical segment 236, or the drain conduit tee coupler 242. The transition passage 270 is defined as a conduit having a pesticide intake segment port 274 at an inlet end thereof and a pesticide intake continuation coupling section 278 formed at an opposite end thereof. The end of the pesticide intake segment 272 adjacent to the pesticide intake segment port 274 can be supported by a pesticide conduit bracket 262. The pesticide conduit bracket 262 can be an independent structure attached to an adjacent element or be integrated into the hardware attachment bracket 260. An optional delivery conduit plug 264 can be removably inserted into the pesticide intake segment port 274 to avoid undesirable transfer of water through the pesticide delivery system 250 to an area between the bathtub 110 and the wall. The fluid retentive seal 271 can be accomplished in any manner. One exemplary fluid retentive seal 271 would be a utilization of silicone seal. A second exemplary fluid retentive seal 271 would be provided by forming the pesticide intake segment 272 and the overflow entry elbow 232 as a unitary component during a molding process. A third exemplary fluid retentive seal 271 would be to utilize threaded interfaces, including a threaded wall and a plurality of threaded fittings. The transition passage 270 comprising a threaded section, the pesticide intake segment 272 comprising a threaded section, and wherein engagement between the transition passage 270 threaded section and the pesticide intake segment 272 threaded section form the fluid retentive seal 271. The exemplary embodiment integrates the pesticide intake segment 272 into the overflow entry elbow 232. The pesticide intake segment 272 can be provided in any reasonable shape. The exemplary pesticide intake segment 272 includes an intake segment elbow 276 to redirect a flow of the pesticide from a horizontal flow to a vertical flow. It is understood that the pesticide intake segment 272 can be integrated into other components of the overflow drain system 230, such as the wall of the overflow conduit vertical segment 236.

A pesticide distribution conduit 252 is provided in fluid communication with the pesticide intake continuation coupling section 278 at a first end and continues positioning a pesticide delivery port 258 at a desired pesticide distribution location. The pesticide distribution conduit 252 is preferably fabricated of flexible tubing. In the exemplary embodiment, the pesticide distribution conduit 252 is routed spiraling downward about the overflow drain system 230, continuing along the basin drain system 220 to the desired termination location. The pesticide distribution conduit 252 is preferably secured to the overflow drain system 230, basin drain system 220 using one or more pesticide conduit retaining member 266. The pesticide conduit retaining member 266 can be selected from any known securing devices, including cable ties, clamps, wire looms, and the like.

The overflow drain cover 130 is used to conceal the pesticide delivery system 250, as illustrated in FIG. 1. In use, the user would remove the overflow drain cover 130 by disengaging the overflow cover fasteners 132 from the overflow drain flange 234 and placing the overflow drain cover 130 and overflow cover fastener 132 in a secured location for reinstallation upon completion of treatment as illustrated in FIG. 6. In the exemplary illustration, the overflow drain cover 130 and delivery conduit plug 264 are placed upon the tub peripheral lip 118. The exterminator obtains a pesticide delivery system 300. The pesticide delivery system 300 includes a volume of pesticide stored within a pesticide reservoir 310 and a pesticide delivery conduit 320, where the pesticide delivery conduit 320 provides a fluid passageway between the volume within the pesticide reservoir 310 and a target location. The exterminator connects the pesticide delivery conduit 320 to the pesticide intake segment port 274 and transfers a predetermined volume of pesticide from the pesticide reservoir 310 to the pesticide delivery system 250. The pesticide delivery system 250 distributes the pesticide to the discharge locations determined during the installation. In the above exemplary embodiment, the pesticide is discharged through the pesticide delivery port 258.

Figure 7:
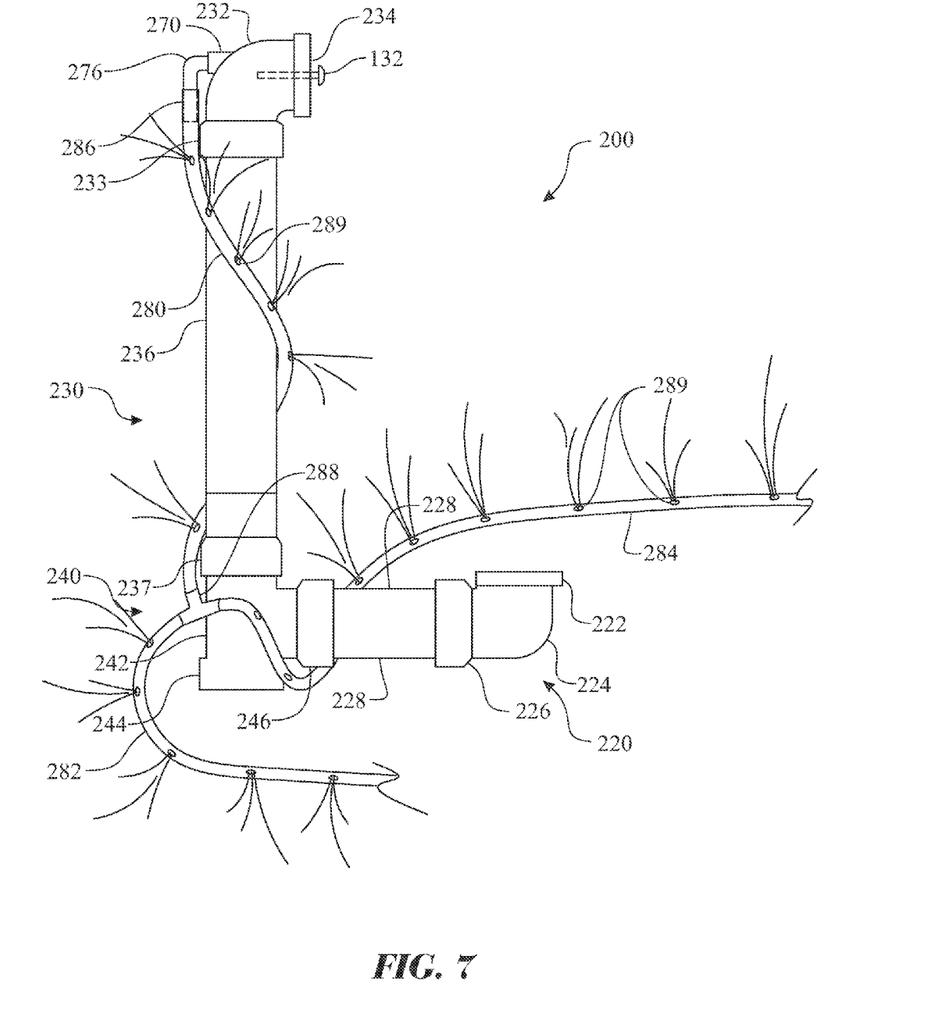
FIG. 7 presents a side view of another exemplary overflow drain pesticide delivery system, the exemplary overflow drain pesticide delivery system further comprising a plurality of pesticide distribution ports spatially arranged about the pesticide distribution conduit and/or pesticide distribution continuation conduits.

In an enhanced embodiment, a first pesticide distribution continuation conduit 282 and a second pesticide distribution continuation conduit 284 are attached to a pesticide distribution conduit 280. The pesticide distribution conduit 280 is similar to the pesticide delivery system 250; wherein the pesticide distribution conduit 280 comprises a plurality of spatially arranged pesticide distribution ports 289. The pesticide distribution conduit 280 is attached to the pesticide intake segment 272 by a pesticide distribution conduit inlet segment 286. The first pesticide distribution continuation conduit 282 and second pesticide distribution continuation conduit 284 are similarly configured; also comprising a plurality of spatially arranged pesticide distribution ports 289. The pesticide distribution conduit 280, first pesticide distribution continuation conduit 282, and second pesticide distribution continuation conduit 284 are preferably fabricated of flexible tubing. The first pesticide distribution continuation conduit 282 and second pesticide distribution continuation conduit 284 are provided in fluid communication with the pesticide distribution conduit 280 by a pesticide distribution conduit manifold 288. The first pesticide distribution continuation conduit 282 and second pesticide distribution continuation conduit 284 can be routed around a perimeter of the bathtub 110, along the walls, or along any other path to distribute the pesticide to any desired location within the structure.

The above exemplary embodiments present the utilization of the overflow drain pesticide delivery system 200 with a bathtub 110. Those skilled in the art would recognize the ability to adapt the present invention into other water basin styled fixtures, including sinks, wash basins, and the like. The transition passage 270 can be of any reasonable fluid retaining interface. The pesticide distribution system can be adapted to dispense pesticide to any desired locations.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A discrete pesticide delivery system, the discrete pesticide delivery system comprising:
    a plumbing fixture overflow drain system comprising;
    an overflow port attachment flange in fluid communication with at least one overflow conduit terminating at a collective sewage joint; and
    a pesticide delivery system comprising:
    a pesticide intake segment comprising a pesticide intake segment port located at an inlet end thereof and a pesticide intake continuation coupling section located at an opposite end thereof, the pesticide intake segment passing through a transition passage formed through a wall of a section of the at least one overflow conduit, the transition passage comprising a fluid retentive seal between an exterior of the pesticide intake segment and the overflow conduit wall, and
    a pesticide distribution conduit comprising a pesticide intake continuation coupling section located at a connection end thereof and at least one pesticide delivery port located along the pesticide distribution conduit and at a distance from the pesticide intake continuation coupling section of the pesticide distribution conduit, the pesticide intake continuation coupling section of the pesticide intake segment being in fluid communication with the pesticide intake continuation coupling section of the pesticide distribution conduit.

2. A discrete pesticide delivery system as recited in claim 1, the pesticide delivery system further comprising a delivery conduit plug removably inserted into the pesticide intake segment port to seal the pesticide delivery system.

3. A discrete pesticide delivery system as recited in claim 1, wherein the fluid retentive seal is molded into the wall of one section of the at least one overflow conduit.

4. A discrete pesticide delivery system as recited in claim 1, the transition passage further comprising a threaded section, the pesticide intake segment further comprising a threaded section, wherein engagement between the transition passage threaded section and the pesticide intake segment threaded section form the fluid retentive seal.

5. A discrete pesticide delivery system as recited in claim 1, wherein the fluid communication between the pesticide intake segment and the pesticide distribution conduit is provided by an engagement between the pesticide intake segment and the pesticide distribution conduit at the respective pesticide intake continuation coupling sections, wherein the engagement employs a barbed interface.

6. A discrete pesticide delivery system as recited in claim 1, wherein the fluid communication between the pesticide intake segment and the pesticide distribution conduit is provided by an engagement between the pesticide intake segment and the pesticide distribution conduit at the respective pesticide intake continuation coupling sections, wherein the engagement employs an overlap friction interference interface.

7. A discrete pesticide delivery system as recited in claim 1, wherein the pesticide distribution conduit is routed locating at least one of the at least one pesticide delivery port to a location below a bottom surface of a plumbing fixture.

8. A discrete pesticide delivery system, the discrete pesticide delivery system comprising:
    a plumbing fixture overflow drain system comprising;
    an overflow port attachment flange in fluid communication with at least one overflow conduit terminating at a collective sewage joint; and
    a pesticide delivery system comprising:
    a pesticide intake segment comprising a pesticide intake segment port located at an inlet end thereof and a pesticide intake continuation coupling section located at an opposite end thereof, the pesticide intake segment passing through a transition passage formed through a wall of a section of the at least one overflow conduit, the transition passage comprising a fluid retentive seal between an exterior of the pesticide intake segment and the overflow conduit wall, and
    a pesticide distribution conduit comprising a pesticide intake continuation coupling section located at a connection end thereof and at least one pesticide delivery port located along the pesticide distribution conduit and at a distance from the pesticide intake continuation coupling section of the pesticide distribution conduit, the pesticide intake continuation coupling section of the pesticide intake segment being in fluid communication with the pesticide intake continuation coupling section of the pesticide distribution conduit.

9. A discrete pesticide delivery system as recited in claim 8, the pesticide delivery system further comprising a delivery conduit plug removably inserted into the pesticide intake segment port to seal the pesticide delivery system.

10. A discrete pesticide delivery system as recited in claim 8, wherein the fluid retentive seal is molded into the wall of one section of the at least one overflow conduit.

11. A discrete pesticide delivery system as recited in claim 8, the transition passage further comprising a threaded section, the pesticide intake segment further comprising a threaded section, wherein engagement between the transition passage threaded section and the pesticide intake segment threaded section form the fluid retentive seal.

12. A discrete pesticide delivery system as recited in claim 8, wherein the fluid communication between the pesticide intake segment and the pesticide distribution conduit is provided by an engagement between the pesticide intake segment and the pesticide distribution conduit at the respective pesticide intake continuation coupling sections, wherein the engagement employs a barbed interface.

13. A discrete pesticide delivery system as recited in claim 8, wherein the fluid communication between the pesticide intake segment and the pesticide distribution conduit is provided by an engagement between the pesticide intake segment and the pesticide distribution conduit at the respective pesticide intake continuation coupling sections, wherein the engagement employs an overlap friction interference interface.

14. A discrete pesticide delivery system as recited in claim 8, wherein the pesticide distribution conduit is routed locating at least one of the at least one pesticide delivery port to a location below a bottom surface of a plumbing fixture.

15. A method of delivering a pesticide, the method comprising the steps of:
    removing an overflow drain cover of a plumbing fixture overflow drain system comprising a pesticide delivery system, wherein the pesticide delivery system includes:

a pesticide intake segment comprising a pesticide intake segment port located at an inlet end thereof and a pesticide intake continuation coupling section located at an opposite end thereof, the pesticide intake segment passing through a transition passage formed through a wall of a section of an overflow conduit of a water retaining basin, the transition passage comprising a fluid retentive seal between an exterior of the pesticide intake segment and the overflow conduit wall, and a pesticide distribution conduit comprising a pesticide intake continuation coupling section located at a connection end thereof and at least one pesticide delivery port located along the pesticide distribution conduit and at a distance from the pesticide intake continuation coupling section of the pesticide distribution conduit, the pesticide intake continuation coupling section of the pesticide intake segment being in fluid communication with the pesticide intake continuation coupling section of the pesticide distribution conduit;

engaging a pesticide delivery conduit with the pesticide intake segment port; and transferring a pesticide through the pesticide delivery conduit into the pesticide distribution conduit for discharge through the at least one pesticide delivery port.

16. A method of delivering a pesticide as recited in claim 15, the method comprising the additional step of:

removing a delivery conduit plug from the pesticide intake segment port prior to the step of engaging the pesticide delivery conduit with the pesticide intake segment port.

17. A method of delivering a pesticide as recited in claim 15, the method comprising the additional step of:

discharging the pesticide through a plurality of pesticide delivery ports, the pesticide delivery ports being spatially arranged along at least a portion of a length of the pesticide distribution conduit.

18. A method of delivering a pesticide as recited in claim 15, wherein the pesticide distribution conduit is routed locating at least one of the at least one pesticide delivery port to a location below a bottom surface of a plumbing fixture, the method comprising the additional step of:

discharging the pesticide through the at least one pesticide delivery port at the location below the bottom surface of the plumbing fixture.

19. A method of delivering a pesticide as recited in claim 15, the method comprising the additional step of:

discharging the pesticide through a plurality of pesticide distribution continuation conduits, each of the plurality of pesticide distribution continuation conduits is provided in fluid communication with the pesticide intake segment.

20. A method of delivering a pesticide as recited in claim 19, the method comprising the additional step of:

discharging the pesticide through a plurality of pesticide delivery ports, the pesticide delivery ports being spatially arranged along at least a portion of a length of each of the plurality of pesticide distribution continuation conduits.

* * * * *